United States Patent
Hornung et al.

(10) Patent No.: US 10,564,973 B2
(45) Date of Patent: Feb. 18, 2020

(54) APPARATUS AND METHOD FOR SHARING BRANCH INFORMATION STORAGE ENTRIES BETWEEN THREADS THAT SHARE AN ADDRESS TRANSLATION REGIME

(71) Applicant: ARM LIMITED, Cambridge (GB)

(72) Inventors: Alexander Alfred Hornung, Cambridge (GB); Ian Michael Caulfield, Cambridge (GB)

(73) Assignee: ARM LIMITED, Cambridge (GB)

( * ) Notice: Subject to any disclaimer, the term of this patent is extended or adjusted under 35 U.S.C. 154(b) by 333 days.

(21) Appl. No.: 14/947,030

(22) Filed: Nov. 20, 2015

(65) Prior Publication Data

US 2017/0147346 A1 May 25, 2017

(51) Int. Cl.
*G06F 9/38* (2018.01)
*G06F 12/10* (2016.01)

(52) U.S. Cl.
CPC .......... *G06F 9/3806* (2013.01); *G06F 9/3844* (2013.01); *G06F 12/10* (2013.01)

(58) Field of Classification Search
CPC .......... G06F 9/32; G06F 9/3844; G06F 12/10; G06F 12/109; G06F 9/3806
See application file for complete search history.

(56) References Cited

U.S. PATENT DOCUMENTS

| | | | | |
|---|---|---|---|---|
| 7,036,003 B1* | 4/2006 | Sunayama | .......... | G06F 9/30189 712/233 |
| 2006/0026382 A1* | 2/2006 | Hirano | ................ | G06F 12/1045 711/207 |
| 2006/0242391 A1* | 10/2006 | Elwood | ............... | G06F 9/30149 712/238 |
| 2008/0162868 A1* | 7/2008 | Glew | .................. | G06F 12/1027 711/203 |
| 2014/0129800 A1* | 5/2014 | Deutschle | ........... | G06F 12/1027 711/207 |
| 2014/0223141 A1* | 8/2014 | Combs | ................ | G06F 12/1036 712/207 |
| 2015/0268957 A1* | 9/2015 | Bonanno | ............. | G06F 9/30058 712/239 |

* cited by examiner

*Primary Examiner* — David J. Huisman
(74) *Attorney, Agent, or Firm* — Nixon & Vanderhye PC

(57) ABSTRACT

A processor fetches instructions from a plurality of threads. Each entry in a branch information storage (BIS) stores a virtual address ID for a branch, information about the branch, and thread ID information. The BIS is accessed using a virtual address of an instruction to be fetched for a thread to determine whether a hit exists, and if so, to obtain the branch information stored in the entry that gave rise to the hit. The virtual address is converted into a physical address, and an address translation regime is specified for each thread. When allocating an entry into the BIS, allocation circuitry determines, for a branch instruction for a current thread, whether the address translation regime is shared by plural threads. If so, the allocation circuitry identifies both the current thread and any other thread for which the address translation regime is shared.

16 Claims, 10 Drawing Sheets

| BTB STORAGE 142 | TARGET ADDRESS 144 | BRANCH INFO (CONDITIONAL?/ CALL?/RETURN?) 146 | PROCESSOR STATE (EXCEPTION LEVEL, S/NS) 148 | VALID T0 150 | VALID T1 152 |
|---|---|---|---|---|---|
| SOURCE ADDRESS [INCLUDING PORTION IDENTIFYING TTBR] | | | | | |
| | | | | | |
| | | | | | |

APPARATUS AND METHOD FOR SHARING BRANCH INFORMATION STORAGE ENTRIES BETWEEN THREADS THAT SHARE AN ADDRESS TRANSLATION REGIME

BACKGROUND

The present technique relates to an apparatus and method for managing a branch information storage referred to by fetch circuitry when fetching instructions for processing by a processor.

Within a data processing apparatus, fetch circuitry can be employed to fetch instructions from memory for execution by an associated processor pipeline. To improve the overall performance, it is useful for the fetch circuitry to detect at an early stage instructions that are branch instructions, as information about such branch instructions can be used to influence which subsequent instructions to fetch from memory.

To assist the fetch circuitry in detecting the presence of branch instructions, it is known to provide branch information storage in association with the fetch circuitry, which contains a plurality of entries, where each entry identifies an address indication for a branch instruction, along with associated branch information about that branch instruction. The branch information can take a variety of forms, but may for example identify a target address for the branch instruction.

The branch information storage is an expensive resource with a finite number of entries, and accordingly it would be desirable to provide a mechanism for making more efficient use of the available entries within the branch information storage.

SUMMARY

In one example configuration, there is provided an apparatus comprising: a processor to process instructions, comprising fetch circuitry to fetch instructions from a plurality of threads for processing by the processor; branch information storage having a plurality of entries, each entry storing a virtual address identifier for a branch instruction, branch information about the branch instruction, and thread identifier information indicating Which of the plurality of threads that entry is valid for; the fetch circuitry being arranged to access the branch information storage using a virtual address of an instruction to be fetched for one of the plurality of threads, in order to determine whether a hit condition exists, and in that event to obtain the branch information stored in the entry that gave rise to the hit condition; address translation circuitry to apply an address translation regime to convert the virtual address into a physical address, at least one address translation regime being specified for each thread; and allocation circuitry for the branch information storage to determine, when allocating an entry to the branch information storage for at least one branch instruction for a current thread, whether the address translation regime is shared with the current thread and at least one other thread, and to identify within the thread identifier information of the allocated entry both the current thread and any other thread for which the address translation regime is shared.

In another example configuration, there is provided a method of managing a branch information storage within an apparatus having a processor to process instructions and fetch circuitry to fetch instructions from a plurality of threads for processing by the processor, the branch information storage having a plurality of entries, each entry for storing a virtual address identifier for a branch instruction, branch information about the branch instruction, and thread identifier information indicating which of the plurality of threads that entry is valid for, the method comprising: accessing the branch information storage using a virtual address of an instruction to be fetched for one of the plurality of threads, in order to determine whether a hit condition exists, and in that event providing to the fetch circuitry the branch information stored in the entry that gave rise to the hit condition; applying an address translation regime to convert the virtual address into a physical address, at least one address translation regime being specified for each thread; and determining, when allocating an entry to the branch information storage for at least one branch instruction for a current thread, whether the address translation regime is shared with the current thread and at least one other thread, and to identify within the thread identifier information of the allocated entry both the current thread and any other thread for which the address translation regime is shared.

In a yet further example configuration, there is provided an apparatus comprising: processor means for processing instructions, comprising fetch means for fetching instructions from a plurality of threads for processing by the processor means; branch information storage means having a plurality of entries, each entry for storing a virtual address identifier for a branch instruction, branch information about the branch instruction, and thread identifier information indicating which of the plurality of threads that entry is valid for; the fetch means for accessing the branch information storage means using a virtual address of an instruction to be fetched for one of the plurality of threads, in order to determine whether a hit condition exists, and in that event to obtain the branch information stored in the entry that gave rise to the hit condition; address translation means for applying an address translation regime to convert the virtual address into a physical address, at least one address translation regime being specified for each thread; and allocation means for the branch information storage means for determining, when allocating an entry to the branch information storage means for at least one branch instruction for a current thread, whether the address translation regime is shared with the current thread and at least one other thread, and to identify within the thread identifier information of the allocated entry both the current thread and any other thread for which the address translation regime is shared.

BRIEF DESCRIPTION OF THE DRAWINGS

The present technique will be described further, by way of example only, with reference to embodiments thereof as illustrated in the accompanying drawings, in which:

FIG. 3 illustrates various fields that may be provided within the entries of the BTB storage of FIG. 2 in accordance with one embodiment;

DESCRIPTION OF EMBODIMENTS

Figure 1:
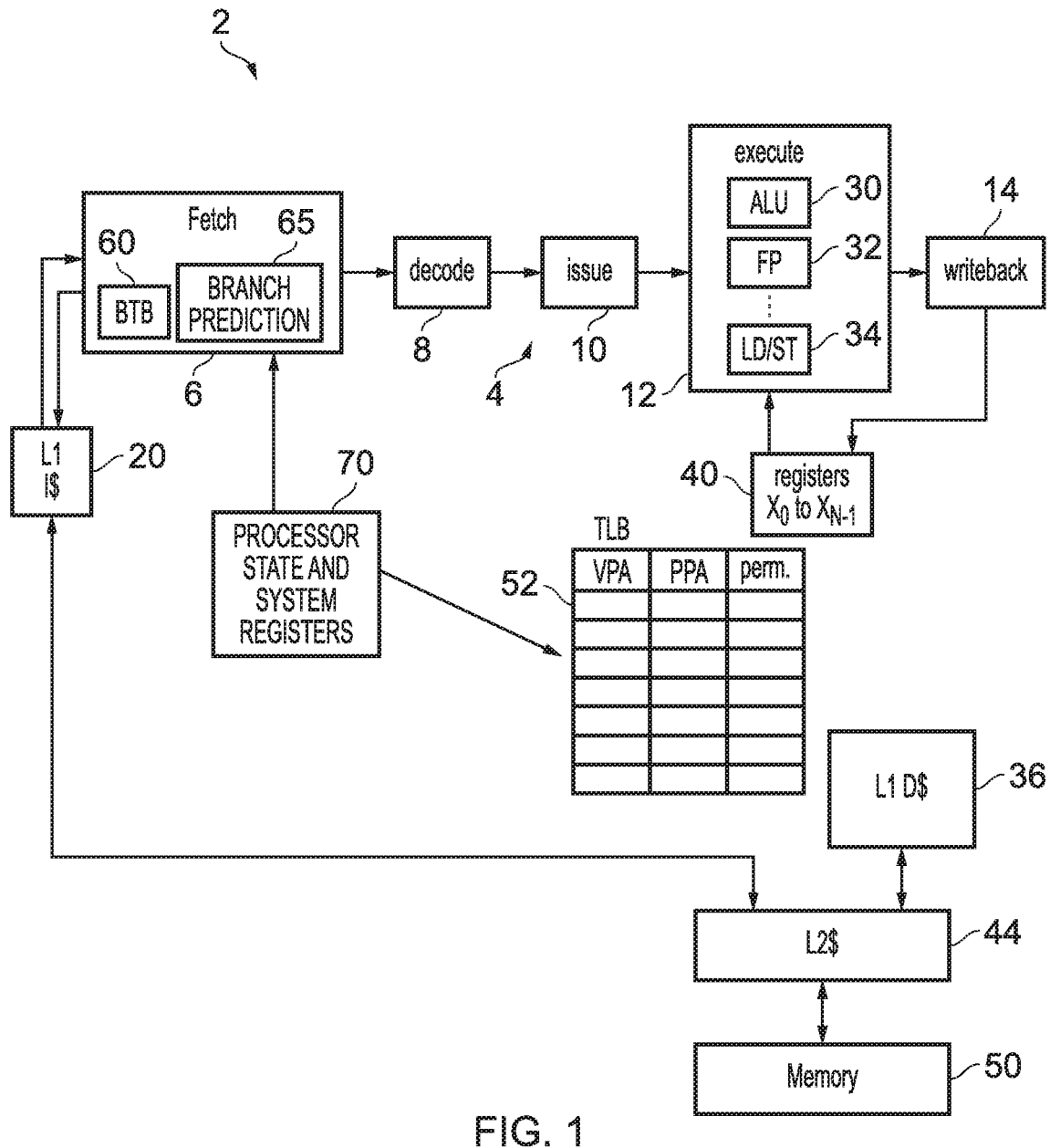
FIG. 1 is a block diagram of a data processing apparatus in accordance with one embodiment.

Before discussing the embodiments with reference to the accompanying figures, the following description of embodiments is provided.

As mentioned earlier, a branch information storage may be used by fetch circuitry to assist in the early detection of branch instructions. Typically at the fetch stage, the storage locations of instructions are identified by a virtual address, with these virtual addresses needing to be converted into a physical address within the memory system. Accordingly, the branch information storage entries will typically specify virtual addresses.

However, the mapping between virtual addresses and physical addresses (referred to herein as the address translation regime) will vary dependent on a number of factors, such as the current processor state, the software routine that is being executed, etc. Hence, an individual entry within the branch information storage needs to capture sufficient information to identify such factors, so that it can be determined in any particular instance, having regards to a virtual address being fetched, whether there is in fact a hit in the branch information storage, taking those factors into account.

In systems where the address translation regime can change due to multiple factors, this can lead to a proliferation in the number of entries that it is desirable to maintain within the branch information storage. This problem is further exacerbated in modern data processing systems which support a form of fine-grained multithreading, for example simultaneous multithreading (SMT). In an SMT system, the processing pipeline may include at least one pipeline stage configured to hold in flight instructions from multiple threads concurrently. Unlike conventional pipelines which may support multiple threads on a coarse-grained basis so that one particular thread is processed at a given time, and periodic interrupts may trigger context switching between threads, with register state associated with the old thread being saved to memory so that the same registers may be used for storing data for the new thread, with an SMT system multithreading is supported at a more fine grained level so that instructions from multiple threads can be resident within the pipeline at once. Each instruction may be tagged with an identifier identifying which of the threads that instruction belongs to. Multiple sets of registers may be provided for handling the architectural state associated with each thread, so that it is not necessary to perform state saving or state restoration operations when switching between threads.

Whilst an example embodiment will be described later herein with reference to an SMT system, the technique can also be useful in a variety of other systems, for example a more-traditional fine-grained multi-threading system. In such a system, each pipeline stage of the processing pipeline may be configured to hold in flight instructions from a single thread, but one pipeline stage may hold in flight instructions from a different thread to another pipeline stage. With such an approach, rather than each instruction being tagged with a thread identifier, each pipeline stage may have a shared thread identifier which identifies the thread from which each of the instructions in that pipeline stage was fetched.

When considering the requirements for the branch information storage within such fine-grained multithreading systems, it will be appreciated that, in addition to the existing factors that may dictate the address translation regime, the address translation regime may also vary dependent on the thread being executed. Accordingly, this leads to the need for thread specific entries within the branch information storage, hence placing further pressure on the sizing requirements of the branch information storage.

The present technique aims to reduce such pressure within a fine-grained multithreading system.

In particular, in one embodiment, an apparatus is provided that has a processor to process instructions, including fetch circuitry to fetch instructions from a plurality of threads for processing by the processor. Branch information storage has a plurality of entries, where each entry stores a virtual address identifier for a branch instruction, branch information about the branch instruction, and thread identifier information indicating which of the plurality of threads that entry is valid for. The fetch circuitry is arranged to access the branch information storage using a virtual address of an instruction to be fetched for one of the plurality of threads, in order to determine whether a hit condition exists, and in that event obtains the branch information stored in the entry which gave rise to the hit condition. As discussed earlier, this can then influence the further fetching activity of the fetch circuitry. Furthermore within the apparatus address translation circuitry is provided to apply an address translation regime to convert a virtual address into a physical address, in order to enable an instruction referenced by a virtual address (and indeed data referenced by a virtual address) to be accessed from the correct physical address in memory. In one embodiment, there will be at least one address translation regime specified for each thread.

When allocating an entry into the branch information storage, the allocation circuitry is aware of the thread currently executing that branch instruction. However, for at least some types of branch instruction allocated into the branch information storage, the allocation circuitry is arranged not only to capture within the entry information about that current thread, but also is arranged to perform an additional check operation to identify whether the entry can also be marked as valid for any other threads. In particular, the allocation circuitry is arranged to determine whether the address translation regime being used for the current thread is also shared with at least one other thread, and in that event identifies within thread identifier information of the allocated entry both the current thread and any other thread for which the address translation regime is shared.

In some instances, this can avoid the need to allocate separate entries for each thread, and instead an entry that was actually allocated for one thread may still give rise to a hit being detected when software is executing for another thread. Hence, purely by way of example, if a first thread executes a particular software routine at a particular processor state, and this gives rise to an allocation within the branch information storage for a particular virtual address if that same software routine is later executed at the same processor state by another thread this may enable a hit condition to be detected when that same virtual address is specified, based on the entry that was originally allocated for the first thread, due to the above technique enabling that entry to be marked as valid for multiple threads assuming the address translation regime is determined to be shared.

In one embodiment, the processor is operable in a plurality of processor states, with at least one address translation regime being specified for each processor state. Within such an apparatus, the allocation circuitry may be arranged, when allocating the entry to the branch information storage for the branch instruction for the current thread, to take into account the processor state associated with the branch instruction when determining whether the address translation regime is shared with the current thread and at least one other thread. In particular, whilst for certain processor states an address translation regime may be shared between threads, for other processor states an address translation regime may not be shared. By determining the processor state associated with the branch instruction that is being allocated, this enables not only a determination of the appropriate address translation regime for the current thread, but also a determination as to the address translation regime that would be used if a different thread was also to be executed by the processor when in that particular processor state.

Other factors, in addition to the processor state, may influence the address translation regime being used. For example, in one embodiment, the allocation circuitry may be further arranged to take into account one or more bits of the virtual address for the branch instruction when determining whether the address translation regime is shared with the current thread and at least one other thread. In particular, one or more bits of the virtual address may identify particular system state information which influences the address translation regime being used. Taking this additional information into account, it can then be assessed whether, if another thread were executing at the same processor state, and specified that same virtual address, this would cause the same address translation regime to be used, and accordingly would indicate that the address translation regime is shared between the current thread and that other thread.

In embodiments where the processor may be operated at different processor states, then in one embodiment each entry in the branch information storage may further identify the processor state for which the entry is valid. Hence, when performing a lookup within the branch information storage, not only the thread identifier information but also the processor state information can be analysed in order to determine whether a hit condition has been detected. In particular, if a specified virtual address matches the virtual address identifier in an entry of the information storage, and in addition the processor state and thread identifier information in that entry matches with the current thread and current processor state, then that entry is considered to result in a hit condition, and the branch information for that entry can be returned to the fetch circuitry to influence which subsequent instructions are fetched by the fetch circuitry.

The branch information can take a variety of forms, but in one embodiment comprises a virtual target address for the branch instruction. On detection of the hit condition, the fetch circuitry may then use the virtual target address from that hit entry in order to determine a next instruction to be fetched. Whether the target address information is used or not may depend on other factors. For example, the fetch circuitry may also employ branch prediction circuits to predict whether a branch would be taken or not taken, and accordingly whether it is predicted that the next instruction required will be the one at the target address, or merely be the next sequential address following the branch instructions address.

In one embodiment, the apparatus further comprises system storage to store information indicative of the address translation regime for each thread, and the allocation circuitry is arranged to access the system storage in order to determine whether the address translation regime is shared with the current thread and at least one other thread.

In one embodiment, further information, in addition to the thread information, can be used to identify the information within the system storage that indicates the address translation regime. For example, where the processor is configured to have multiple processor states, the processor state information may be used in combination with the thread information in order to identify the relevant information in the system storage indicating the address translation regime. Hence, the allocation circuitry may use the processor state information, along with the current thread information, to identify from the system storage a particular address translation regime being used, and may then use the processor state information, in combination with a different thread identifier, to identify from the system storage the address translation regime that would be used were the processor executing at that processor state for that different thread. It can hence then determine whether the address translation regime is shared between the current thread and that different thread.

The system storage can take a variety of forms, but in one embodiment comprises a plurality of registers, and the allocation circuitry is arranged to determine, for each thread, having regard to the processor state, an associated register within said plurality. The allocation circuitry is then arranged to compare at least part of the content of the determined associated registers in order to determine whether the address translation regime is shared with the current thread and at least one other thread. In one embodiment, all of the information in the determined associated registers may be compared. However, in other embodiments, it is sufficient to compare just a subset of the information within each of the determined associated registers in order to detect whether there is an address translation regime match.

Whilst in one embodiment a particular processor state and thread combination may identify one particular register within the system storage, in an alternative embodiment other information may be used in addition with the processor state and thread information to identify the particular register. For example, in one embodiment the allocation circuitry is further arranged to take into account one or more bits of the virtual address for the branch instruction when determining the associated registers such embodiments, the thread information, in combination with the processor state information, may identify multiple registers, and the value of the one or more bits of the virtual address is then used to identify a particular register amongst those multiple registers.

The plurality of registers within the system storage that are used in the above process can take a variety of forms, but in one embodiment are translation table base registers (TTBRs). Hence, a combination of the current thread information, the processor state information and one or more of the bits of the virtual address can be used to identify a particular TTBR that will then contain information used to determine the current address translation regime. By performing a similar lookup within the system storage for other possible threads, it is also then possible to identify other TTBRs whose contents can be compared with the identified TTBR for the current thread, in order to detect if there is an address translation regime match between the threads.

In one embodiment, once the associated registers have been determined, at least one field providing an address space identifier is then compared amongst the determined associated registers. The address space identifier can take the form of a single value, or may be expressed in multiple parts. For example, where applications are executed under the control of a virtual machine, the address space identifier may include an application specific part and a virtual machine specific part. Within the system registers, the address space identifier information may be updated under software control, in order to effectively identify which software routine is being executed. Hence, by comparing the address space identifier within one of the system registers identified for the currently executing processor state and current thread, with the equivalent address space identifier information maintained in another system register identified using the same processor state, but a different thread identifier, if the address space identifier information matches between the two registers, this indicates that the same software routine will be executed by that other thread when it is in the same processor state as the current thread, and hence provides an indication that the address translation regime may match.

In one embodiment, certain additional information may also be considered in order to determine whether there is in fact an address translation regime match. In one such embodiment, a hint field within the determined associated registers is also considered. In particular, if the hint field has the same value in multiple of the determined associated registers, then this indicates that the address translation regime is shared by the associated threads if those registers also have the same address space identifier.

Hence, by comparing certain information within the various determined associated registers, it is possible to detect whether any of the other threads would use the same address translation regime if they are being executed at the same processor state as the current thread. In that instance, it is possible to mark the allocated entry in the branch information storage as being valid for multiple threads.

The branch information storage can take a variety of forms, but in one embodiment is a branch target buffer (BTB).

In one embodiment, the allocation circuitry may be arranged to perform the earlier described address translation regime check for any branch instruction that it is seeking to allocate an entry for in the branch information storage. However, in an alternative embodiment, that functionality may be limited to a subset of the branch instructions processed by the apparatus, so that it is only in connection with that subset of branch instructions that it is possible that an entry may be marked as shared between multiple threads. For example, in one embodiment, the above address translation regime check may be performed when allocating direct branches into the branch information storage, such direct branch instructions providing an immediate value encoded directly within the instruction that is used when deriving the target address. Hence, if exactly the same instruction is executed by another thread using the same address translation regime, it will be the case that the same target address will be determined. However, in one embodiment the above approach is not used for indirect branches, where a register specifier is used to identify a register whose contents are used when calculating the target address. In a simultaneous multithreading system, different register sets can be maintained for the different threads, and accordingly the target addresses may differ even if the same address translation regime is used. Hence, when the branch information storage is being used to capture, as part of the branch information, the target address, it may not be appropriate to mark the entries for any indirect branches as being shared between threads.

In one embodiment, the allocation circuitry may be arranged to monitor changes in the information maintained in the system storage that is indicative of the address translation regime, so as to update the thread validity information for certain entries dependent on such changes. In particular, in one embodiment the allocation circuitry is arranged to monitor changes in said information within the system storage and, at least for any entry whose thread identifier information identifies multiple threads, when it is detected that the changes in said information indicate that the address translation regime is no longer shared, to perform a predetermined action in respect of that entry.

The predetermined action can take a variety of forms. For example, in one embodiment it may comprise merely invalidating the entry. Alternatively, it may involve comprising updating the thread identifier information for an entry that was previously marked as valid for multiple threads, so that that thread identifier information at that point merely identifies a single thread for which the entry is now valid. Which single thread is chosen as the thread for which the entry is to remain valid for can be varied dependent on embodiment, but in one embodiment sufficient information may be maintained about the thread that originally caused the entry to be allocated, such that when the entry reverts back to being valid for a single thread, it is allocated as valid for that originating thread.

In one embodiment, the above monitoring functionality can also be applied for entries whose thread identifier information identifies a single thread, so that when it is detected from the changes in the information maintained by the system storage that the address translation regime is now shared, a further predetermined action can be performed in respect of such an entry. For example, that further predetermined action may comprise updating the thread identifier information to now identify that the entry is valid for multiple threads.

Particular embodiments will now be described with reference to the figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 65 for predicting the outcome of branch instructions, and the fetch stage 6 can fetch instructions from a (non-sequential) branch target address if the branch is predicted taken, or from the next sequential address if the branch is predicted not taken. The branch predictor 65 may include one or more branch history tables for storing information for predicting whether certain branches are likely to be taken or not. For example, the branch history tables may include counters for tracking the actual outcomes of previously executed branches or representing confidence in predictions made for branches.

As will be discussed in more detail later, the fetch stage in one embodiment may also have access to a branch information storage, which in the particular embodiment of FIG. 1 takes the form of a branch target buffer (BTB) 60, and which is used to assist in detecting the presence of branch instructions, and thereby influence which instructions are fetched. The BTB can effectively be used as an early branch prediction mechanism, being referenced at the time the fetch stage outputs an address to the instruction cache 20 in order to seek to detect whether that instruction being fetched is a branch instruction. The BTB may be used in parallel with other branch prediction circuits, and/or additional branch prediction circuits may be used at a later stage, for example once the instruction has actually been fetched, in order to seek to provide a further branch prediction check. In one embodiment the branch predictor 65 forms such a later stage branch prediction mechanism, used to implement a more accurate, potentially multi-cycle, prediction, if this later prediction differs in any way from an early prediction made based on the BTB, the later prediction information can be used to override the earlier prediction and re-steer the fetch stage accordingly.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units Which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address (VPA) of a corresponding page of the virtual address space and a corresponding physical page address (PPA) to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions (perm) such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

The TLB mechanism used to provide the virtual to physical address translation in one embodiment has access to processor state and system registers 70, providing information used to determine the appropriate virtual to physical address translation at any particular point in time. The information used to determine how a virtual address is translated to a physical address is referred to herein as the address translation regime. The address translation regime can vary dependent on a number of factors. For example, the processor may be arranged to switch between different processor states, and the address translation regime will typically depend on the current processor state that the processor is operating in. In the embodiments described herein, these processor states will be referred to as exception levels. For at least some of the exception levels, there may be more than one address translation regime that can be used. For example, in one embodiment, one or more bits of the virtual address may be used to identify, in combination with the exception level, a particular system register whose contents will influence the address translation regime. In one particular embodiment, the system registers whose contents are used when determining the address translation regime are referred to as translation table base registers (TTBRs).

In one embodiment, the address translation regime may also vary dependent on which program thread is being executed by the processor. More particularly, in one embodiment the processing pipeline of FIG. 1 supports simultaneous multithreading (SMT). Unlike conventional pipelines which may support multiple threads on a coarse-grained basis so that one particular thread is processed at a given time and periodic interrupts may trigger context switching between threads, with register state associated with the old thread being saved to memory so that the same registers may be used for storing data for the new thread, with an SMT system multithreading is supported at a more fine-grained level so that instructions from multiple threads can be resident within the pipeline at once. Each instruction may be tagged with an identifier identifying which of the threads that instruction belongs to. Various of the tracking structures within the processor pipeline, such as an issue queue for queueing instructions to be issued in the issue stage 10, a load/store queue for queueing load or store instructions to be processed by the load/store stage 34, a decode queue for queueing instructions to be decoded by the decode stage 8, etc. may hence include instructions from several threads at a time. In addition, the set of registers 40 may include a number of register banks corresponding to the respective threads, so that each thread's architectural state may be retained by the pipeline simultaneously, and it is not necessary to switch between threads using interrupts, context switches and state saving/restoration.

Certain of the system registers 70 may in addition be replicated, and for example the earlier mentioned TTBR registers may be replicated for each of the threads. Accordingly, when considering the address translation regime, this may vary depending not only on which exception level the processor is executing at, but also which thread is executing.

Returning to the earlier discussion of the BTB 60, this will include a plurality of entries, where each entry includes a source virtual address for an instruction that has been detected to be a branch instruction, and associated branch information for that branch instruction, which in one embodiment may comprise at least a target address for the branch instruction.

Since each BTB entry is populated using a virtual address, and given that multiple different address translation regimes may be used within the processor, it will be appreciated that it is necessary to capture within the entry sufficient information about the address translation regime applicable to that entry, so that when a lookup is performed based on a current virtual address it can be ensured that a hit will only be detected if both the virtual address of an entry matches the current virtual address, and the address translation regime is the same as that applicable to the current virtual address.

However, it will be appreciated that such a necessity can lead to a proliferation in the number of entries required within the BTB storage, particularly in the earlier mentioned SMT systems where the address translation regime is dependent not only on the processor state, but is also dependent on which thread is being executed.

As will be discussed in more detail below, the present technique aims to reduce the pressure on the number of entries required within the BTB storage, by identifying situations where an entry can be marked as valid for multiple threads.

Figure 2:
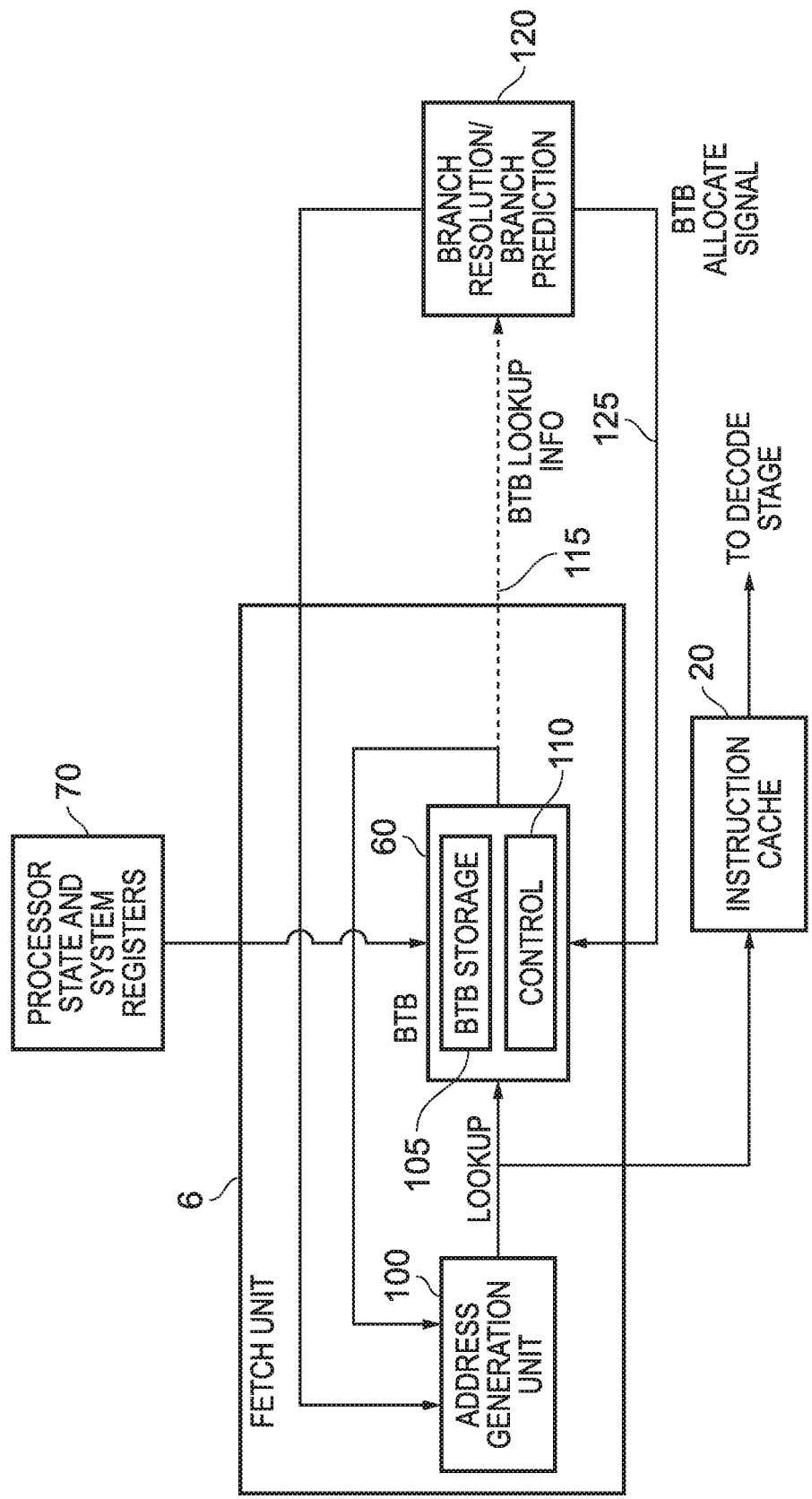
FIG. 2 is a diagram illustrating in more detail the use of a branch target buffer (BTB) in accordance with one embodiment.

FIG. 2 is a block diagram illustrating in more detail the operation of the fetch unit 6 in accordance with one embodiment. The fetch unit includes an address generation unit 100 that is used to generate virtual addresses to be issued to the instruction cache 20 in order to fetch instructions. As each virtual address is generated, a lookup is performed within the BTB 60, which includes both the actual BTB storage 105 and associated control circuitry 110 used to control access to the BTB storage, and also to control allocation of entries into the BTB storage. The outcome of the lookup within the BTB is routed back to the address generation unit 100 in order to influence the next address issued by the address generation unit. For example, if a hit is detected in the BTB storage, the target address may be used to determine the next virtual address to be fetched (optionally dependent on any parallel branch direction (i.e. taken/not taken) prediction). In the absence of a hit, the address generation unit may merely issue as the next fetch address a sequential address.

The instruction cache 20 can take a variety of fortes, but in one embodiment is a virtually indexed, physically tagged, cache, and hence the virtual address issued by the address generation unit 100 can be used to identify a set within the instruction cache, but with address translation performed by the TLB 52 then being needed to determine whether there is actually a hit in any of the entries of the set. In the event of a hit, the instruction can be returned from the instruction cache to the fetch circuitry, for onward propagation to the decode stage 8, and in the event of a miss the instruction will be obtained from a lower level of the cache hierarchy/main memory and then returned via the instruction cache 20 to the fetch circuitry for onward propagation to the decode stage 8.

As shown by the dotted line 115, information about the result of the lookup in the BTB will be propagated through the pipeline for use by any later branch prediction circuits and/or branch resolution stage 120. As mentioned earlier, more accurate later stage branch predictors could be included, that would typically also receive the instruction fetched from the instruction cache, and make a more accurate determination of whether the instruction is a branch instruction and also whether it is predicted that the branch will be taken or not taken. This prediction can be compared with the results obtained from the BTB lookup, and in the event of any discrepancy a control signal can be issued from the stage 120 back to the address generation unit 100 within the fetch unit 6 to re-steer fetching as appropriate. Any instructions which have been fetched incorrectly based on the outcome of the BTB lookup can then be flushed from the pipeline in the usual manner.

Similarly, when the branch is actually resolved, typically during the execute stage 12, then to the extent this differs from the prediction, a control signal can be issued back to the fetch unit 6 to re-steer the fetch circuitry to fetch the appropriate instructions, and in addition any incorrectly fetched instructions can be flushed from the pipeline.

Based on the branch prediction behaviour detected by the branch resolution/branch prediction stage 120, entries can then be allocated into the BTB 60 through the issuance of an allocate signal over path 125. In particular, the branch resolution/branch prediction stage 120 can identify the branch instruction, specifying both its virtual address, and other information required to identify the address translation regime applicable, such as the exception level and the thread identifier. In addition, it can provide certain information about the branch, such as the target address, and based on this information the control circuitry 110 within the BTB 60 will then allocate an entry within the BTB storage 105. Following such an allocation, if the same virtual address is later issued for the same processor state and thread ID, a hit can be detected in the BTB storage.

However, in addition, in the embodiments described hereafter the allocation circuitry within the control circuitry 110 may further be arranged to perform some additional address translation regime checks at the time the entry is allocated, so that in certain instances it is possible to mark a single entry as being valid for multiple threads. This avoids in certain situations the need for multiple entries to be used to capture branch information for the different threads, hence reducing the pressure on the storage requirements of the BTB.

FIG. 3 is a diagram schematically illustrating the fields provided within each entry of the BTB storage 105 in accordance with one embodiment. The first field 142 is arranged to store a source address identifier, this being a virtual address identifier against which a virtual address issued by the address generation unit 100 will be compared in one embodiment, the virtual address portion within the source address identifier includes those bits of the virtual address that identify the TTBR, and hence captures the virtual address bits which influence the address translation regime.

A further field 144 stores a target address for the branch instruction, and optionally a further field 146 may store additional branch information, such as whether the branch instruction is conditional, whether it is a call function, a return function, etc.

A further field 148 is used to store the processor state, which includes the exception level information in the embodiments described herein. In addition, in embodiments that support separate secure and non-secure states, the processor state can also capture the secure/non-secure information.

Further, the BTB storage entry includes thread identifier information identifying which threads the entry is valid for. In one embodiment, the processor is assumed to allow two threads to be executed at the same time within the processor pipeline, these threads being referred to herein as thread T0 and thread T1, and accordingly a separate valid bit 150, 152 can be provided for each of those threads. It will be appreciated that the technique is not limited to situations where there are only two threads, and any number of threads may be allowed to co-exist within the pipeline at the same time, with the BTB storage entry containing sufficient information to identify which of those threads the entry is valid for.

Figure 4:
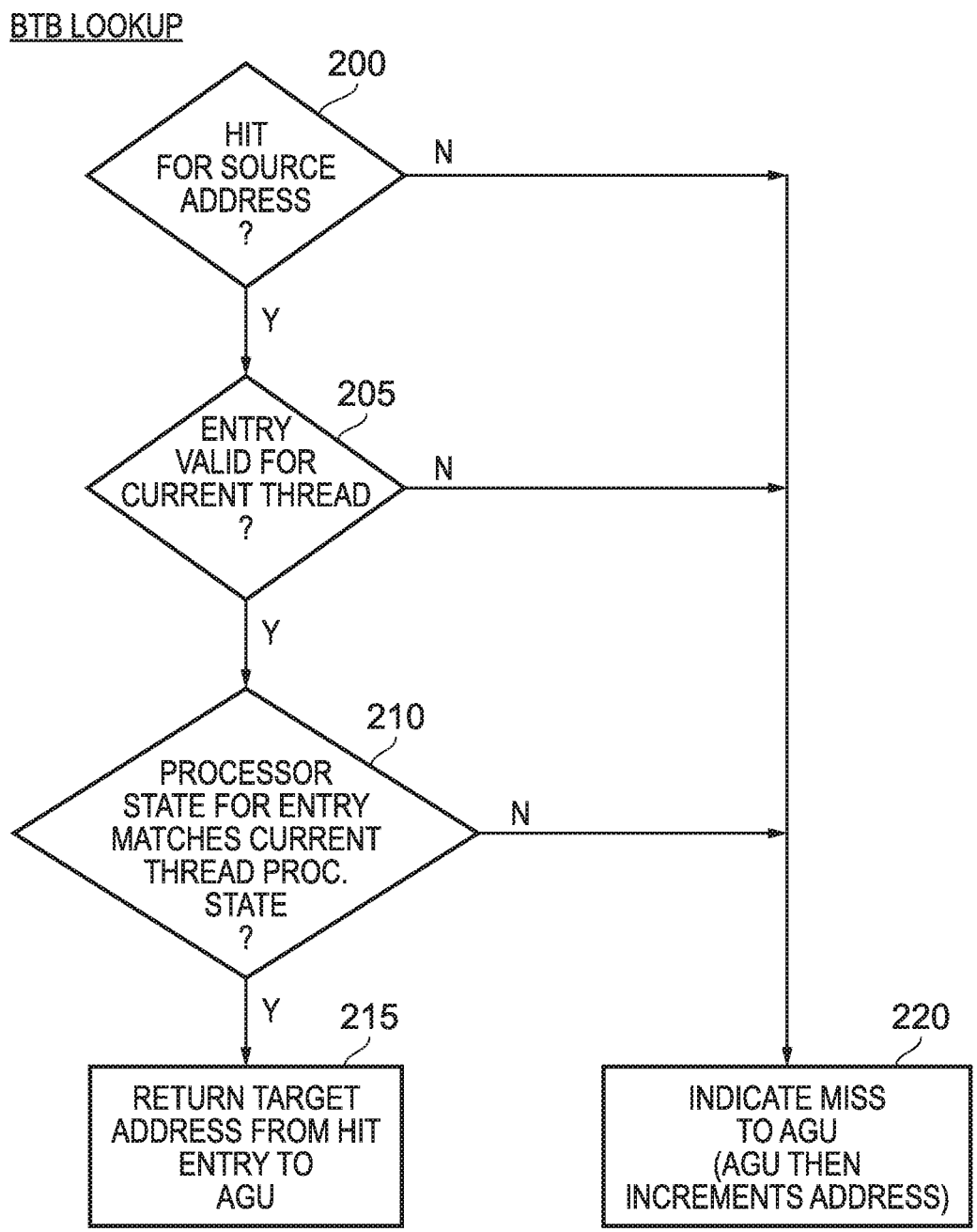
FIG. 4 is a flow diagram illustrating a BTB lookup process in accordance with one embodiment.

FIG. 4 is a flow diagram illustrating the BTB lookup process performed upon receipt of a virtual address from the address generation unit 100. At step 200, the entries in the BTB storage are analysed to see whether there is a hit for the specified source address, i.e. whether the virtual address provided matches any of the virtual addresses stored in the source address field 142 of the BTB storage entries. If not, then a miss will be indicated to the address generation unit (AGU) at step 220, causing the AGU to then increment the address when generating the next fetch address.

If there is a hit for the source address, then it is determined at step 205 whether the entry that gave rise to that hit is valid for the current thread, i.e. the thread that will be executing the instruction specified by the virtual address issued by the AGU 100. If not, then the process will again proceed to step 220 to indicate a miss in the BTB.

However, in the event that the entry is valid for the current thread, it is then determined at step 210 whether the processor state for the entry matches the processor state of the current thread. If it does not, then again a miss will be indicated to the AGU at step 220, but otherwise the process will proceed to step 215 where the target address and any other related branch information from the hit entry is returned to the AGU 100 to influence the next virtual address issued by the AGU.

Whilst steps 200, 205 and 210 have been shown as being performed sequentially in FIG. 4, it will be appreciated that these checks can in one embodiment be performed in parallel.

Figure 5:
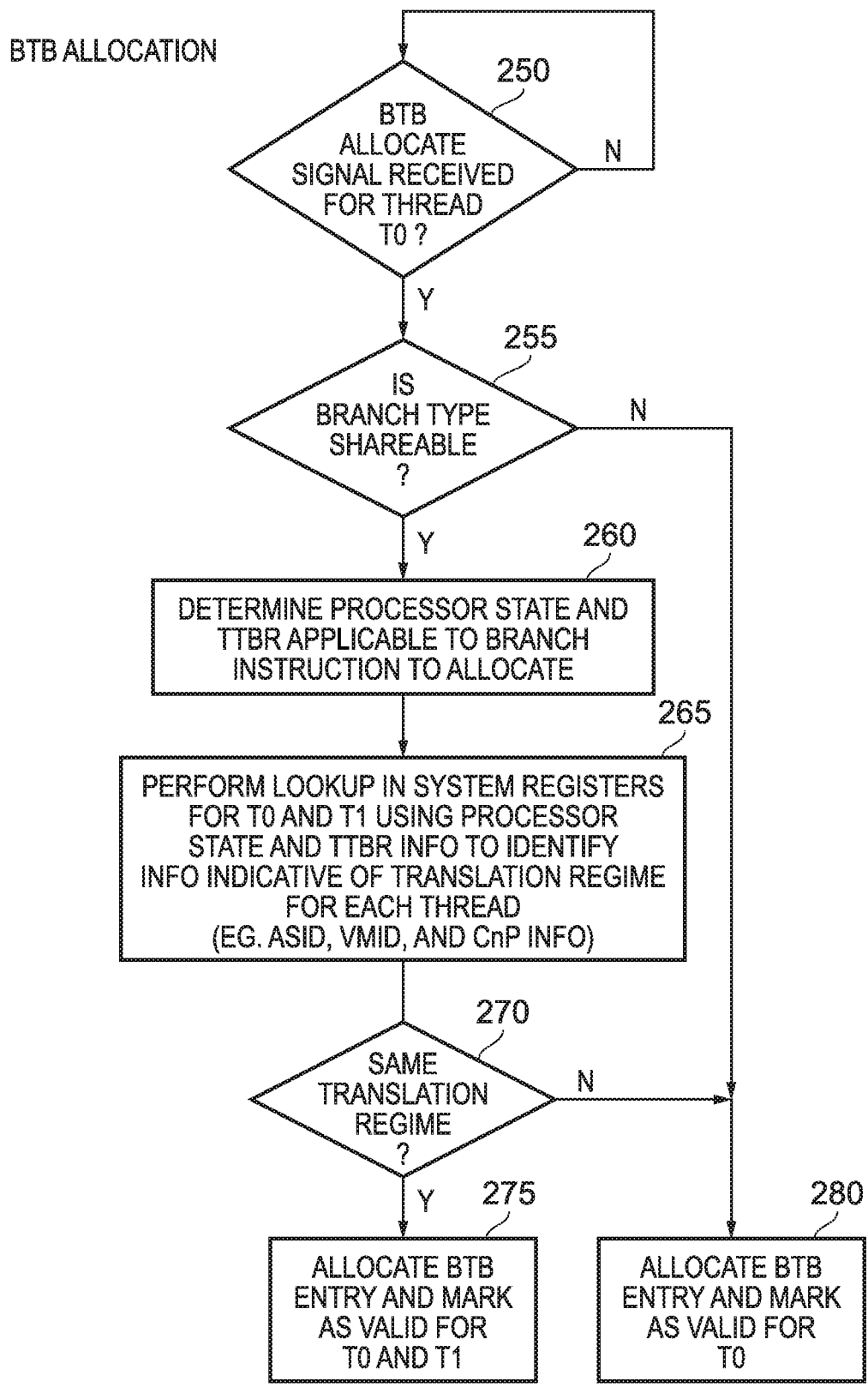
FIG. 5 is a flow diagram illustrating a BTB allocation process in accordance with one embodiment.

FIG. 5 is a flow diagram illustrating the BTB allocation process in accordance with one embodiment, i.e. the process performed by the allocation circuitry of the BTB on receipt of an allocate signal over path 125 from the branch resolution/branch prediction stage 120. At step 250, it is determined whether a. BTB allocate signal has been received for a particular thread. Essentially, the process of FIG. 5 is performed in parallel for each of the threads, but for ease of illustration it will be assumed that the process is considering an allocate signal being received for thread T0. When it is determined at step 250 that an allocate signal has been received for thread T0, it is then determined at step 255 whether the branch type is sharable. In particular, whilst in one embodiment it may be considered that all of the possible types of branches are potentially sharable, i.e. could be allocated a single entry within the BTB, in one particular embodiment only a subset of the possible branch instructions are considered to be sharable. In particular, in one embodiment direct branches (both conditional and unconditional) are considered to be sharable, but indirect branches are not. Indirect branches specify their target address with reference to a register specifier and, as mentioned earlier, in an SMT system the register set 40 may include different register banks for each of the threads. Accordingly, the target addresses can diverge between the threads even if the address translation regime is shared, and accordingly in one embodiment it is decided that indirect branches will not be considered sharable.

Further, in one embodiment branch instructions in the form of "returns" are considered sharable. Whilst the return address specified by such returns can diverge between the threads in the same way as for indirect branches, in one particular embodiment the BTB does not capture the return target addresses for such returns, and instead that information is held elsewhere. Accordingly, in that particular embodiment returns can be considered sharable.

Similarly, in one embodiment the direction of conditional branches (i.e. whether they are predicted taken or not taken) is captured separately from the information in the BTB, so there is no need to take account of direction divergence when determining whether the current branch instruction is of a branch type that can be sharable.

If it is determined at step 255 that the branch type is not sharable, then the process proceeds to step 280 where the allocation circuitry allocates the BIB entry in the standard manner, marking the entry as valid for the single thread (in this example thread T0).

However, if it is determined at step 255 that the branch type is sharable, the processor state and TTBR information applicable to the branch instruction being allocated is determined. As mentioned earlier, the TTBR information can be determined from one or more bits of the virtual address, in one particular embodiment this information being derived from bit 48 of the virtual address, there being two possible TTBRs for any particular processor state.

Using the information determined at step 260, the allocation circuitry then performs a lookup in the system registers 70 for both the current thread T0, and also for any other threads that share the processor pipeline with thread T0, in this example it being assumed that there are two threads T0 and T1. In particular, based on the processor state and TTBR info, particular TTBR registers can be identified within the system registers 70 for both thread T0 and thread T1, and the information maintained in those registers for each of the threads can then be compared to see if they match.

Whilst in one embodiment all of the information in the TTBRs could be compared for this purpose, in another embodiment it is only necessary to compare a subset of the information contained in the TTBR registers. In particular, in one embodiment each TTBR includes a hint field, referred to as the CnP field, which when set in the identified registers for both thread T0 and thread T1 gives an indication that the address translation regime will be shared provided certain address space identifier information also matches. In particular, whilst the hardware may provide a separate TTBR for each processor state and for each thread, the software can update address space information within those TTBRs to give an indication of Which software routine is being executed at a particular processor state. This address space information may include an ASID field which is set by the software within the TTBR register. If the address translation takes place in multiple stages, there may be one or more further fields that combine with the ASID to provide the overall address space identifier information. For example, in a virtual machine implementation, there may also be a VMID field which is used in combination with the ASID information to provide the address space identifier.

At step 265, having identified the relevant TTBR registers for thread T0 and thread T1, the CnP information can be checked to determine whether it is set in the relevant registers for each of the threads, and if so a check can be made against the ASID information, and YARD information if applicable, in order to determine whether that information also matches between the threads. If it does, then this indicates that the same address translation regime is applicable for the entry being allocated into the BIB. Accordingly, if at step 270 it is determined that the same address translation regime is being used, then at step 275, when allocating the BTB entry, the allocation circuitry is arranged to mark the entry as valid for both threads T0 and thread T1. Conversely, if it is determined that the same address translation regime is not being used, then the process proceeds to step 280 where the entry is allocated in the standard manner, and hence marked as valid for the single thread T0.

Figure 6A:
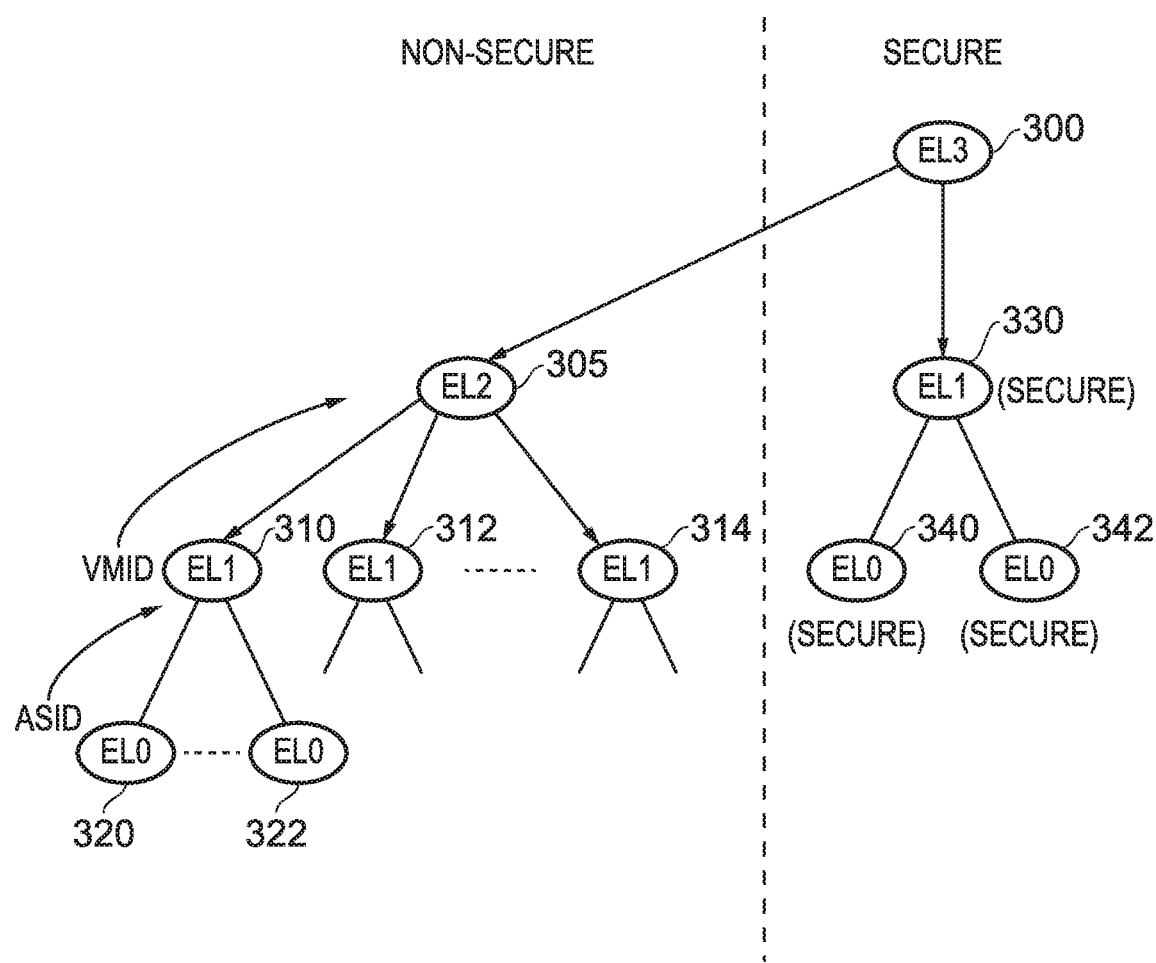
FIG. 6A illustrates how multiple processor states may be provided in accordance with one embodiment.

FIG. 6A illustrates the interrelationship between the various exception levels in one embodiment. The exception level EL0 has the lowest software execution privilege, and execution at EL0 is called unprivileged execution. Increased values of n, from 1 to 3, indicate increased software execution privilege. The EL2 exception level provides support for processor virtualisation. Meanwhile the EL3 stage provides support for two security states, namely the secure and the non-secure states.

This gives rise to the general tree structure shown in FIG. 6A. In particular, if an EL3 exception level is provided, such as EL3 300 shown in FIG. 6A, it will run in a secure state. In the non-secure state, it is possible if desired to support virtualisation, and accordingly an EL2 exception level 305 may be provided in the non-secure state. Within the secure state, in one embodiment, an EL2 level is not provided, and instead an EL1 level 330 may be provided within the secure state, under which a number of different EL0 levels 340, 342 may be provided.

In the non-secure state, if an EL2 level 305 is provided, it may support beneath that multiple EL1 levels 310, 312, 314, and each of those EL1 levels may support one or more EL0 levels, as shown schematically by the reference numerals 320, 322. Whilst any particular EL0 instance 320 will have an ASID assigned to it by the relevant EL1 level, if virtualisation is supported, then the relevant EL1 level will also have a VMID allocated to it by the EL2 level 305, as shown schematically in FIG. 6A.

Figure 6B:
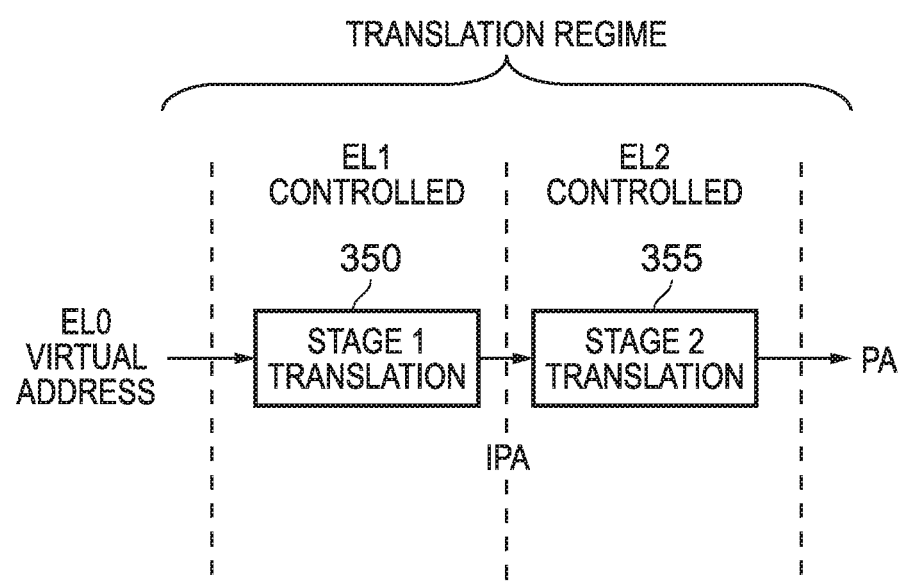
FIG. 6B illustrates how the translation regime may vary dependent on the current processor state in accordance with one embodiment.

FIG. 6B schematically illustrates the translation regime in a situation where a multi-stage address translation is performed. In particular, it is assumed that a virtual address is specified by software running at the EL0 level. Assuming a virtualised environment, then a two-stage translation process may be performed, where the stage 1 translation 350 converts the virtual address into an intermediate physical address, with the address translation performed being controlled by the relevant EL1 level. The address translation used may vary dependent on each EL0 instance, and hence the ASID information is relevant to determining whether an address translation regime matches between different threads.

A stage 2 address translation 355 is then used to convert the intermediate physical address into a physical address, with that stage 2 translation being controlled by the EL2 level. The stage 2 translation may vary dependent on the EL1 instance under consideration, and accordingly the VIVID information is also relevant to determining whether there is an address translation regime match between different threads.

Whilst FIG. 6B illustrates a two-stage address translation process, it will be appreciated that there is no requirement for such a two-stage translation, and a single translation stage may instead be used to convert a virtual address into a physical address. Indeed, the number of stages of address translation involved in converting a virtual address to a physical address may vary dependent on the current exception level at which the software is executing.

Figure 7:
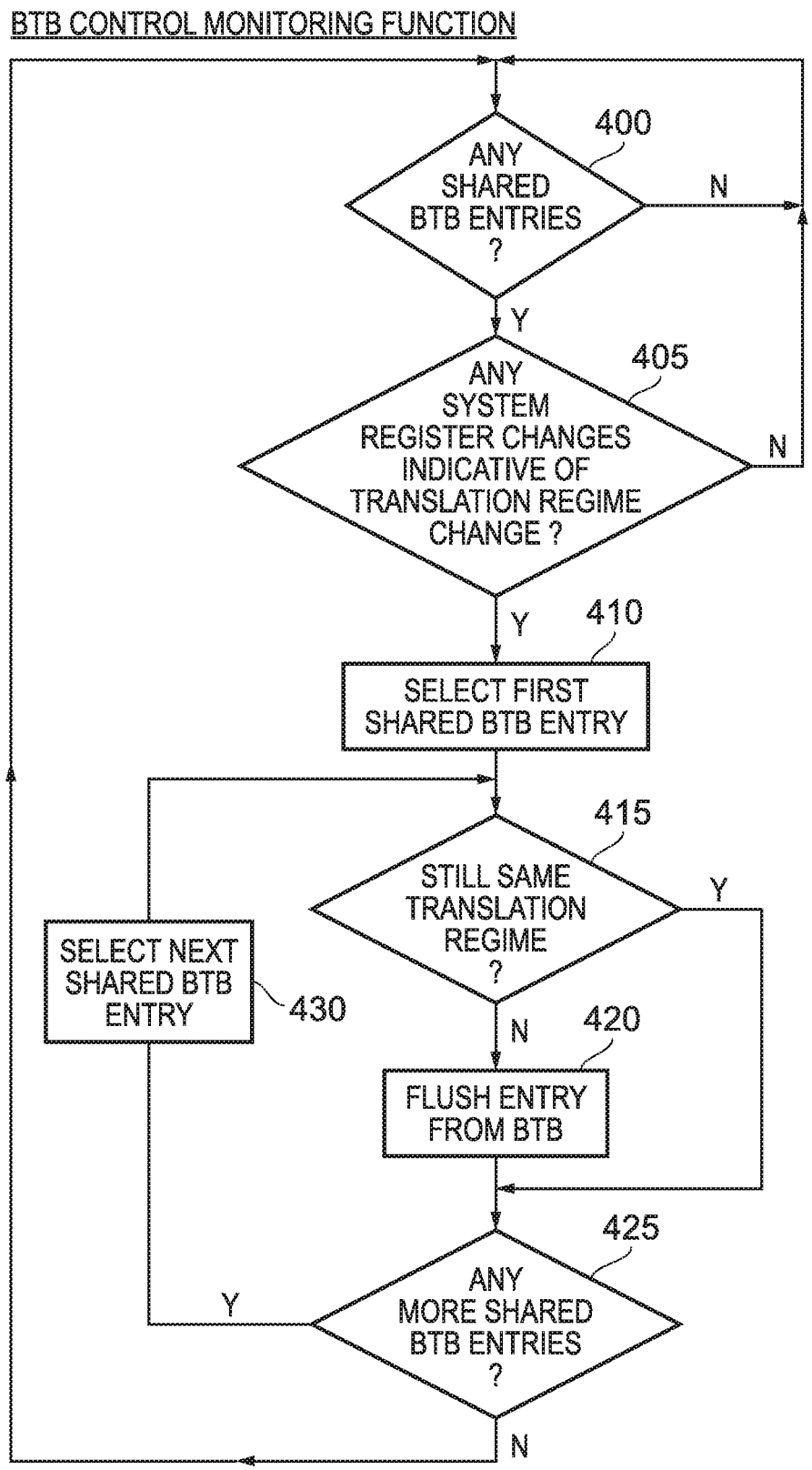
FIG. 7 is a flow diagram illustrating a BTB control monitoring operation performed in accordance with one embodiment.

In one embodiment, the operation of the allocation circuitry can be enhanced to perform a BTB control monitoring function. In particular, as shown in FIG. 7, a process can be performed to detect situations where any shared BTB entries (i.e. entries that are marked as valid for multiple threads) should no longer be shared, and to take an appropriate corrective action. In particular, at step 400, it is determined whether there are currently any shared BTB entries within the BTB storage 105. If not, no further action is required, but assuming there are one or more shared BTB entries, then at step 405 the control circuitry 110 determines, with reference to the system register information 70, whether any system register changes have been made Which would be indicative of a translation regime change. If not, then again no action is required, but assuming at step 405 it is determined that the contents of one or more of the relevant system registers has changed in a manner that would indicate a change in the translation regime, each of the shared BTB entries is considered further, using the process discussed in the remainder of FIG. 7.

At step 410, a first shared BTB entry is selected. Which shared BTB entry is selected first is entirely arbitrary, and indeed in one embodiment the serial process shown in the remainder of FIG. 7 could be parallelised if desired. For the BTB entry selected at step 410, it is then determined at step 415 Whether the same translation regime still applies across the multiple threads that have been marked as valid within that entry. This effectively involves re-performance of the steps 260, 265 of FIG. 5, albeit for an entry that has already been allocated. If it is determined that the same translation regime does not apply, then at step 420 the entry is flushed from the BTB so that it can no longer be used to detect a hit. The process then proceeds to step 425, or proceeds directly from step 415 to step 425 if it is determined that the same translation regime does still apply.

At step 425, it is determined Whether there are any more shared BIB entries to be considered, and if so the next one is selected at step 430 prior to the process returning to step 415. Once all of the entries have been considered, the process returns to step 400.

Figure 8:
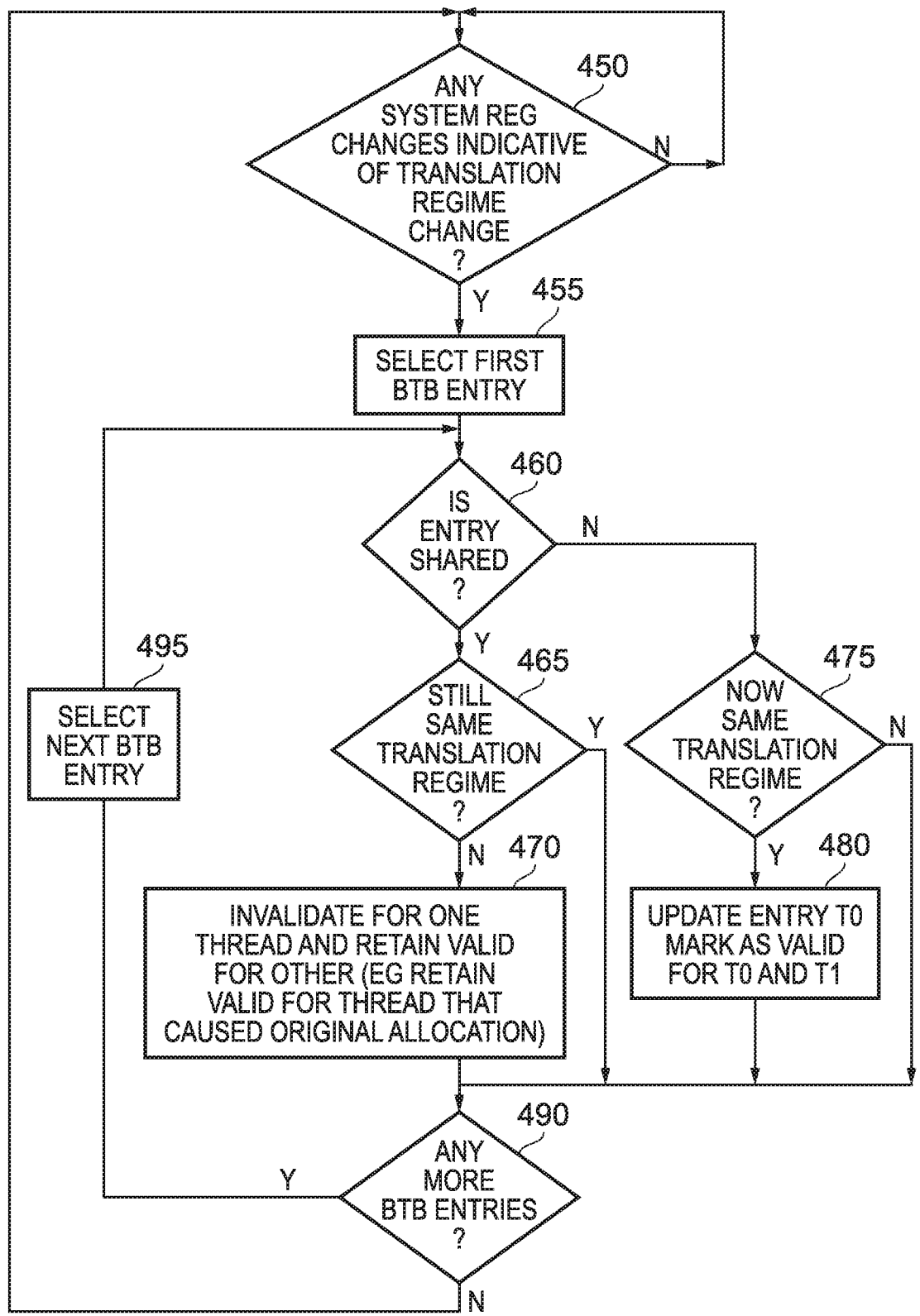
FIG. 8 is a flow diagram illustrating a BTB control monitoring operation that may be performed in accordance with an alternative embodiment.

FIG. 8 shows an alternative BTB control monitoring function that is extended to consider all of the allocated entries, not just the shared allocated entries. At step 450, it is determined whether any system register changes have been made that are indicative of translation regime changes between the threads. If so, then a first BTB entry is selected at step 455, whereafter it is determined at step 460 whether the entry is shared. If it is, then the process proceeds to step 465 where it is determined whether the same address translation regime still applies, using the process discussed earlier with reference to step 415 of FIG. 7. If it does, then no action is required, and the process proceeds to step 490. However, if it is determined that the same translation regime does not apply, then the process proceeds to step 470. Whilst this could involve flushing the entry as per the example of FIG. 7, in this particular embodiment it is assumed that instead the entry is modified so that it is invalidated for all but one of the threads, i.e. it is converted into an entry that is valid for a single thread. The choice as to which thread it is maintained valid for can be varied dependent on implementation. However, in one embodiment sufficient information could be retained within the entry to identify the thread that originally gave rise to the entry being allocated, and at step 470 the entry could be modified so that it is retained as purely being valid for that original thread.

If the entry is not shared, then the process proceeds from step 460 to step 475, where it is then determined whether the same address translation regime does now apply. Step 475 can be performed by effectively performing steps 260 and 265 of FIG. 5. When it is determined that the same translation regime does now apply, then the entry can be updated at step 480 to mark the entry as being valid for both threads T0 and T1. Otherwise, no further action is required, and the process proceeds to step 490.

Once the process reaches step 490, it is determined whether there are any more BTB entries to consider, and if so the next entry is selected at step 495, prior to the process returning to step 460. Once all BTB entries have been considered, the process returns to step 450.

Figure 9:
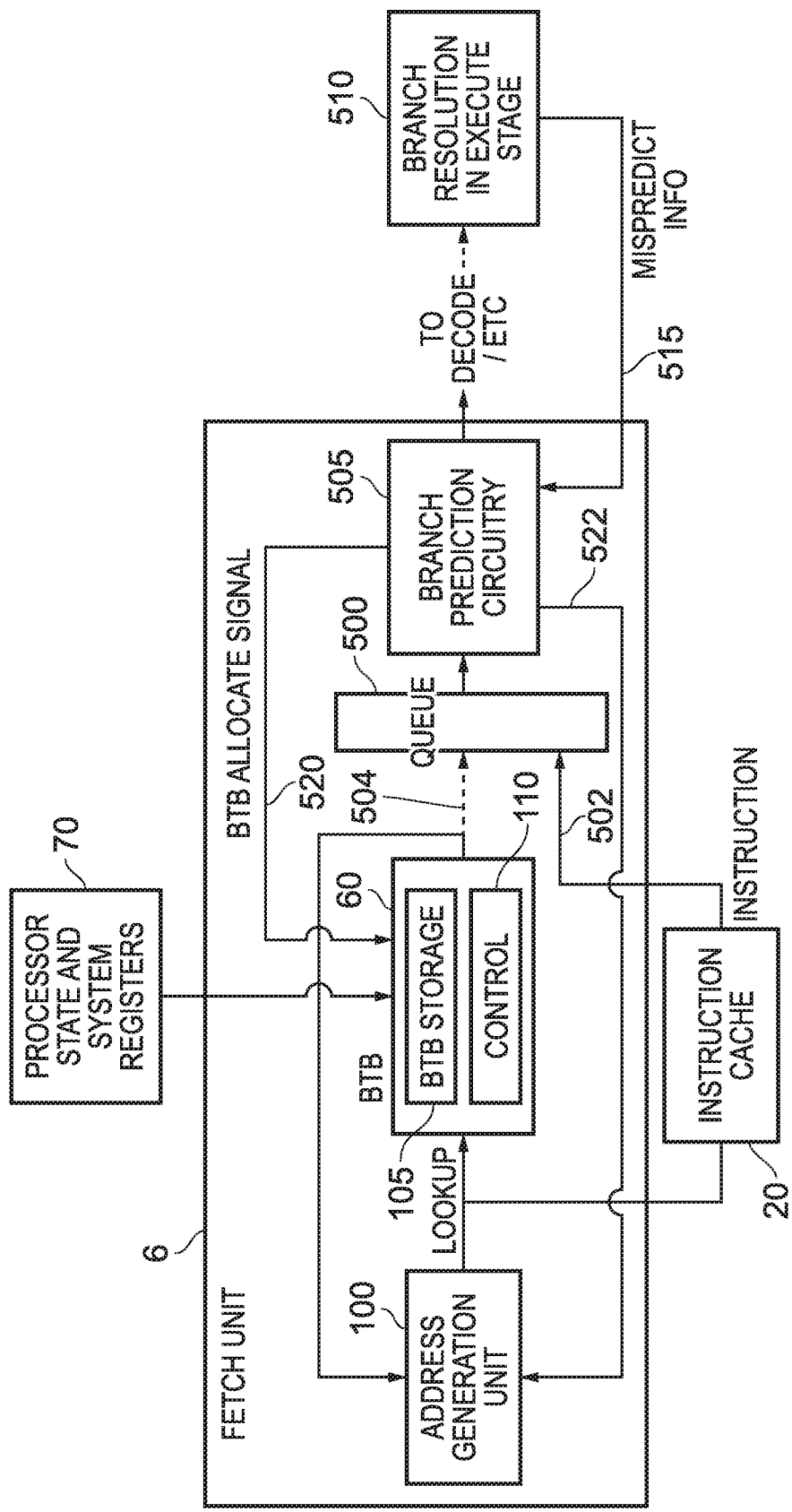
FIG. 9 is a diagram illustrating components provided within the fetch unit in accordance with one embodiment.

FIG. 9 is a block diagram illustrating a fetch unit in accordance with a particular embodiment, where the fetch unit includes both the BTB 60, and a later stage branch prediction circuit 505 that is arranged to provide a more accurate prediction than the prediction available from the BTB. The address generation unit 100, BTB 60 and instruction cache 20 operate in the same way as discussed earlier with reference to FIG. 2. However, the instructions retrieved from the instruction cache are then routed over path 502 into an instruction queue 500, the queue entries also capturing the associated BTB lookup information for those instructions as routed over path 504.

Each queued instruction is then passed to the branch prediction circuitry 505 which can implement any one of a number of known different branch prediction mechanisms in order to determine whether the instruction is a branch, and the predicted behaviour of the branch. In the event that there is any discrepancy between the branch prediction detected by the branch prediction circuitry 505 and that indicated by the BTB 60, then a signal can be routed back to the address generation unit over path 522 to re-steer subsequent fetching of instructions as required. Any fetched instructions in the interim can then be discarded from the queue 500.

The instructions as analysed by the branch prediction circuitry 505 are then routed to the subsequent stages of the pipeline, starting with the decode stage, and at some point this will result in branch resolution taking place in the execute stage, as indicated by the box 510. In the event that the branch resolution differs from the prediction made by the branch prediction circuitry 505, then a mispredict signal can be routed back over path 515 to the branch prediction circuitry, to cause the branch prediction circuitry to perform any appropriate update to the information it retains in order to perform the branch prediction. In addition, it will typically be necessary to flush from the pipeline the subsequently fetched instructions for the relevant thread, with fetching being re-steered as determined by the information from the branch resolution stage.

In the embodiment shown in FIG. 9, it is the branch prediction circuitry 505 that issues the allocate signal over path 520 to the BIB 60. Hence, based on the information determined by the more accurate branch predictor 505, the BIB can be updated so as to thereafter allow an early detection of such branch instructions. In the event that misprediction information over path 515 indicates errors in the branch prediction, then in addition to updating its own local records, the branch prediction circuitry can send control signals to the BTB to cause the required entry to be updated accordingly. In one embodiment, the branch prediction circuitry 505 can also update the BTB 60 based on any mispredictions that it detects, independently of any misprediction information received over path 515.

In a yet further alternative embodiment, the allocation into the BTB may not occur from the branch prediction circuitry 505 within the fetch unit, but instead may occur in due course based on the outcome of the branch resolution in the execute stage 510.

It will be appreciated that the above described embodiments provide an efficient mechanism for managing entries in a branch information storage used by fetch circuitry when fetching instructions for execution, in one embodiment the branch information storage comprising a BTB. In particular, the described techniques can significantly reduce pressure on the required size for the BTB when used in fine-grained multithreading systems Where multiple threads may be present within the pipelined processor at the same time, the described techniques avoiding the potential duplication of entries for multiple threads in certain situations.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order o provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. An apparatus comprising:
a processor to process instructions, comprising fetch circuitry to fetch instructions from a plurality of threads for processing by the processor;
branch information storage having a plurality of entries, each entry storing a virtual address identifier for a branch instruction, branch information about the branch instruction, and thread identifier information indicating which of the plurality of threads that entry is valid for;
the fetch circuitry being arranged to access the branch information storage using a virtual address of an instruction to be fetched for one of the plurality of threads, in order to determine whether a hit condition exists, and, when the hit condition exists, to obtain the branch information stored in the entry that gave rise to the hit condition;
address translation circuitry to apply an address translation regime to convert the virtual address into a physical address, at least one address translation regime being specified for each thread; and
allocation circuitry for the branch information storage to perform a check operation to determine, when allocating an entry to the branch information storage for at least one branch instruction for a current thread, whether an address translation regime being applied for the current thread is shared by the current thread and at least one further thread, and to identify within the thread identifier information of the allocated entry which of the plurality of threads are determined to share, with the current thread, the address translation regime being applied for the current thread;
wherein the processor is operable in a plurality of processor states, at least one address translation regime being specified for each processor state;
the apparatus further comprising system storage to store information indicative of the at least one address translation regime for each thread and each processor state, wherein:
the system storage comprises a plurality of registers, and the allocation circuitry is arranged to determine, for each thread, having regard to the processor state associated with the at least one branch instruction, an associated register within said plurality of registers; and
the allocation circuitry is arranged to compare at least part of the content of the determined associated register for each of the current thread and the at least one further thread in order to determine whether the address translation regime being applied for the current thread is shared by the current thread and the at least one further thread.

2. An apparatus as claimed in claim 1, wherein the allocation circuitry is further arranged to take into account one or more bits of the virtual address for the at least one branch instruction when determining whether the address translation regime being applied for the current thread is shared by the current thread and the at least one further thread.

3. An apparatus as claimed in claim 1, wherein each entry in the branch information storage further identifies the processor state for which the entry is valid.

4. An apparatus as claimed in claim 1, wherein:
the branch information comprises a virtual target address for the at least one branch instruction;
on detection of the hit condition, the fetch circuitry using the virtual target address from the entry that gave rise to the hit condition in order to determine a next instruction to be fetched.

5. An apparatus as claimed in claim 1, wherein the allocation circuitry is further arranged to take into account one or more bits of the virtual address for the at least one branch instruction when determining the associated register.

6. An apparatus as claimed in claim 1, wherein said at least part of the content of the determined associated register comprises at least one field providing an address space identifier.

7. An apparatus as claimed in claim 6, wherein said at least part of the content of the determined associated register comprises a hint field which when set in the determined associated register indicates that the address translation regime being applied for the current thread is shared with any threads whose determined associated registers also have the same address space identifier.

8. An apparatus as claimed in claim 1, wherein said plurality of registers are translation table base registers (TTBRs).

9. An apparatus as claimed in claim 1, wherein said branch information storage is a branch target buffer (BTB).

10. An apparatus as claimed in claim 1, wherein the allocation circuitry is arranged, for a subset of branch instructions processed by the apparatus, to allow the thread identifier information to identify multiple threads.

11. An apparatus as claimed in claim 1,
wherein;
the allocation circuitry is arranged to monitor changes in said information within the system storage and, at least for a given entry whose thread identifier information identifies multiple threads, when it is detected that the changes in said information within the system storage indicate that the address translation regime associated with that given entry is no longer shared, to perform a predetermined action in respect of that entry.

12. An apparatus as claimed in claim 11, wherein said predetermined action comprises invalidating the given entry.

13. An apparatus as claimed in claim 11, wherein said predetermined action comprises updating the thread identifier information for the given entry to identify a single thread for which the given entry is now valid.

14. An apparatus as claimed in claim 11, wherein the allocation circuitry is further arranged, for a further given entry whose thread identifier information identifies a single thread, when it is detected that the changes in said information within the system storage indicate that the address translation regime associated with that further given entry is now shared, to perform a further predetermined action in respect of that entry.

15. An apparatus as claimed in claim 14, wherein said further predetermined action comprises updating the thread identifier information for the further given entry to identify multiple threads for which the further given entry is now valid.

16. A method of managing a branch information storage within an apparatus having a processor to process instructions and fetch circuitry to fetch instructions from a plurality of threads for processing by the processor, the branch information storage having a plurality of entries, each entry for storing a virtual address identifier for a branch instruction, branch information about the branch instruction, and thread identifier information indicating which of the plurality of threads that entry is valid for, the method comprising:

accessing the branch information storage using a virtual address of an instruction to be fetched for one of the plurality of threads, in order to determine whether a hit condition exists, and, when the hit condition exists, providing to the fetch circuitry the branch information stored in the entry that gave rise to the hit condition;

applying an address translation regime to convert the virtual address into a physical address, at least one address translation regime being specified for each thread; and performing a check operation to determine, when allocating an entry to the branch information storage for at least one branch instruction for a current thread, whether an address translation regime being applied for the current thread is shared by the current thread and at least one further thread, and to identify within the thread identifier information of the allocated entry which of the plurality of threads are determined to share, with the current thread, the address translation regime being applied for the current thread, wherein the processor is operable in a plurality of processor states, at least one address translation regime being specified for each processor state;

the method further comprising storing information indicative of the at least one address translation regime for each thread and each processor state in a system storage, the system storage comprising a plurality of registers; and the step of performing a check operation comprising:

determining, for each thread, having regard to the processor state associated with the at least one branch instruction, an associated register within said plurality of registers; and comparing at least part of the content of the determined associated register for each of the current thread and the at least one further thread in order to determine whether the address translation regime being applied for the current thread is shared by the current thread and the at least one further thread.

\* \* \* \* \*